United States Patent [19]

Pomerhn et al.

[11] B 3,985,610

[45] Oct. 12, 1976

[54] WATER-RESISTANT ASBESTOS-CEMENT

[75] Inventors: Robert C. Pomerhn, Cheektowaga; Robert M. Johnson, Kenmore, both of N.Y.

[73] Assignee: National Gypsum Company, Buffalo, N.Y.

[22] Filed: Jan. 7, 1974

[21] Appl. No.: 431,072

[44] Published under the second Trial Voluntary Protest Program on January 20, 1976 as document No. B 431,072.

[52] U.S. Cl. .............................. 162/133; 162/145; 162/153; 163/154; 162/155; 162/171; 162/183

[51] Int. Cl.² ...................................... D21F 11/00

[58] Field of Search .......... 162/154, 155, 145, 171, 162/133, 183, 153; 161/205; 106/96, 99; 428/251, 271, 331, 443

[56] References Cited
UNITED STATES PATENTS

| | | | |
|---|---|---|---|
| 1,804,740 | 5/1931 | Buczkowski | 162/155 |
| 1,859,414 | 5/1932 | Stevenson et al. | 162/171 |
| 1,925,584 | 9/1933 | Fisher | 162/171 |
| 2,335,722 | 11/1943 | Adams | 162/145 |
| 2,555,401 | 6/1951 | Fasold et al. | 162/155 |
| 3,087,851 | 4/1963 | Beuscher et al. | 162/171 |
| 3,095,346 | 6/1963 | Sfiscko et al. | 162/154 |
| 3,300,372 | 1/1967 | Bauer | 162/145 |
| 3,344,015 | 9/1967 | Neal et al. | 162/154 |
| 3,509,020 | 8/1970 | Gelsomino | 162/133 |

*Primary Examiner*—S. Leon Bashore
*Assistant Examiner*—Peter Chin
*Attorney, Agent, or Firm*—Robert F. Hause

[57] ABSTRACT

An improved low density asbestos-cement product and the process whereby it is produced wherein an asphalt emulsion is combined with the formulation from which the product is made, which asphalt emulsion has an asphalt phase which asphalt has a softening point of at least 150°F and is dispersed in water in globules all smaller than 10 microns.

6 Claims, No Drawings

WATER-RESISTANT ASBESTOS-CEMENT

This invention relates to the reduction of water absorptivity of a building material formed of Portland cement, asbestos fiber and cellulose fiber.

In the manufacture of cement-fiber sheets on a cylinder type wet machine, a thin wet mat of fibers, such as asbestos fibers, and a cementitious bonding material is formed on the surface of the cylinder screen, transferred to a rotating accumulator roll, upon which successive plies of the mats are wound and a laminated sheet of desired thickness is thereby formed. This sheet is removed from the accumulator roll, compressed to a suitable density and thickness and then cured to provide the desired strength.

A low density cement-fiber sheet will be produced if a portion of the fiber is cellulose fiber. These low density cement-fiber sheets, containing a portion of cellulose fiber, are prone to absorbing water at a faster rate and to a greater percentage and therefore could affect the exterior durability of such products.

The addition of a tar or asphalt waterproofing agent to a board product of wood fiber, asbestos fiber and Portland cement has been previously suggested, as in U. S. Pat. No. 1,606,051, wherein such ingredients are gathered, mixed and molded as individually formed products. Attempts to use asphalt type waterproofing agents in continuous processes such as those employing the cylinder type wet machine and the rotating accumulator roll have generally been found impractical due to the rapid accumulation of asphalt on many of the machine elements.

It is an object of the present invention to provide a method of forming relatively water-resistant low density asbestos-cement products.

It is a further object to provide an improved water-resistant low density asbestos-cement product.

Various other objects and advantages will appear from the following description of the invention.

The present invention involves the manufacture of low density asbestos-cement sheets incorporating a form of asphalt emulsion which permits the continuous production of these products without a troublesome amount of asphalt accumulating on the manufacturing equipment. The low density asbestos-cement sheets are produced from a formulation which includes asphalt emulsion in which the internal asphalt phase consists of an asphalt having a softening point of at least 150°F and preferably of from 180°F to 190°F, and which is present in globules all smaller than 10 microns.

The standard ASTM test for the softening point of asphalts, of a softening point between 85°F and 347°F, involves a ring and ball apparatus in an ethylene glycol bath, and is designated D2398-71.

EXAMPLE I

A low density asbestos-cement sheet was made on equipment adapted for continuous production, using the following formulation:

| | Parts by Weight |
|---|---|
| Portland cement | 35 |
| Asbestos fibers | 15 |
| Cellulose fibers | 9 |
| Asphalt emulsion (59.8% asphalt) | 5 |
| Inorganic siliceous fillers | 36 |
| Sufficient water as required in the well-known cylinder method of wet forming. | |

The ingredients other than the cellulose fiber, the asphalt emulsion and the water are thoroughly mixed in a dry powder Ribbon Mixer.

The cellulose fiber is paper or wood pulp which has been thoroughly disintegrated in a pulper beater tank containing a water slurry of the paper or pulp of about 3% solids.

The cellulose fiber slurry is then transferred through a Reitz disintegrator to a measuring tank, and then to a wet-mixing tank. The dry powder is also transferred to the wet-mixing tank and mixed with the cellulose fiber slurry to form a blended slurry. The asphalt emulsion is then also added and thoroughly blended.

The asphalt emulsion, in accordance with the invention, must be made of an asphalt having a softening point of at least 150°F and the asphalt must be present in the emulsion in a form each portion of which is smaller than ten microns. A suitable asphalt emulsion is Bitusize BB7 sold by Chevron Asphalt Company. It is preferable to filter the asphalt emulsion through a 50 mesh screen as it is being fed to the wet-mixing tank.

The mixed total furnish is then transferred to a holding tank where it is held under continuous agitation and at no more than 110°F, as enough is continuously being withdrawn to keep the cylinders suitably supplied. The furnish is then continuously formed into a continuous web by being deposited on the cylinder screen and then transferred to a felt conveyor. A plurality of cylinders deposit a plurality of webs, laminated, onto the felt conveyor. The material is transferred from the felt conveyor to an accumulator roll where several plies are accumulated and formed into a sheet of desired thickness.

As the above-described mixed total furnish is withdrawn from the holding tank, to be fed to the cylinders, the furnish is directed to a trough, additional dilution water is immediately added along with a cationic retention aid such as a cationic, water soluble, high molecular weight polyacrylamide, or other suitable cationic retention aid, and the furnish, dilution water and cationic retention aid are thoroughly admixed as the materials progress along the trough toward the vats in which the cylinders operate. This addition of a cationic retention aid causes the asphalt emulsion to break, whereby the original individual liquid particles of asphalt are no longer completely and individually surrounded by water, but instead are free to attach themselves to the adjacent solids.

Just before the furnish, containing the broken asphalt emulsion, reaches the end of the trough leading to the cylinder vats, an anionic flocculating agent is added, such as an anionic, water soluble, high molecular weight polyacrylamide, or other suitable anionic flocculating agent. This anionic flocculating agent causes the asphalt to be attracted to the solids in the slurry, including the cement, the fibrous materials, and the inorganic siliceous fillers, and to become attached to these solids and also causes the solids to generally agglomerate. As the solids then proceed into the cylinder vats and then into the continuous web that is formed, the asphalt is carried by the solids into the web that is formed.

The cationic retention aid and the anionic flocculating agent are each used in an amount of from about .05 lb/1,000 lbs. to about .3 lb./1,000 lbs. of mixed total furnish solids.

A ply bonding aid may be added between plies on the accumulator as described in U.S. Pat. No. 3,509,020. Other than for all of those portions of the disclosure which are in any way directed to the novel use of the defined asphalt emulsion, the process of the present invention is essentially all as described in U.S. Pat. No. 3,509,020, and such description therein is embodied herein by reference.

The sheets of the desired thickness removed from the accumulator roll are partially dried, smoothed by a pressure roller and then stored for a pre-cure time of about 7 to 14 days. They are then autoclaved using about 120 psig steam, for about 20 hours.

The finished sheet of this Example has a thickness of ⅜ and may be used with or without coatings. If coating is desired, there is preferably applied a first clear sealer coat followed by a white primer coat, suitable for finish coatings of latex or oil paints, as described in U.S. Pat. No. 3,413,140.

The product has a dry density of about 60 lbs/cu.ft. It will typically have a moisture content of something less than 15% when shipped. If submerged in water for 24 hours, this asphalt-containing product will absorb an amount of water equal to about 35% to 40% of its weight, as compared to an absorption of about 55% for a similar product having no asphalt.

Of particular significance is the fact that the cylinder screens, the felt conveyors, the accumulator roll and other apparatus pick up no more than a trace of asphalt during a typical production run which can easily be removed by making a short run afterwards of the same product having no asphalt content. Alternatively, a relatively easy cleansing, as with gasoline as a solvent, will remove all of the asphalt deposited on the equipment.

EXAMPLE II

A high density asbestos-cement sheet can be made on generally similar equipment, using the following formulation:

|  | Parts by Weight |
|---|---|
| Portland cement | 50 |
| Asbestos fibers | 15 |
| Asphalt emulsion (59.8% asphalt) | 5 |
| Inorganic siliceous fillers | 30 |
| Sufficient water as required in the well-known cylinder method of wet forming | |

The ingredients are mixed, conveyed, treated with retention aid and flocculant and formed into webs on the cylinder screens, which are laminated on an accumulator roll in the same manner as the material of Example I. Ply bonding aids are not essential when cellulose fiber is omitted.

Sheets of desired thicknesses, removed from the accumulator roll, are dried, smoothed, stored for normal cure or autoclaved using the above-described or equivalent known methods.

The product has a dry density of about 100 lbs./cu.ft. If submerged in water for 24 hours, this asphalt-containing product will absorb an amount of water equal to about 10% of its weight, as compared to an absorption of about 20%–30% for similar products having no asphalt. Thus it will be seen that the asphalt treatments as described in Examples I and II, reduce the water absorption of an asbestos-cement product by about one-third to two-thirds, and accomplish this decrease in water absorption without substantial coating of the apparatus or the felt conveyor.

The ingredients of Examples I and II can be further varied within the following ranges:

|  | Parts by Weight |
|---|---|
| Portland cement or equivalent | 30–70 |
| Asbestos fibers | 10–25 |
| Cellulose fibers | 0–15 |
| Asphalt emulsion (59.8% asphalt) | 2–10 |
| Inorganic fillers | 10–50 |

The dry density of the products can vary from about 50 to 120 lbs./cu.ft. The asbestos-cement finished board can range from about ⅛ inch to ½ inch in thickness.

Having completed a detailed disclosure of the preferred embodiments of our invention, so that others may practice the same, we contemplate that variations may be made without departing from the essence of the invention or the scope of the appended claims.

We claim:

1. The method of making an asbestos-cement product of improved water resistance comprising the steps of forming an aqueous slurry of, by weight, from 30 to 50 parts of Portland cement, 10 to 25 parts of asbestos fibers, 10 to 50 parts of inorganic fillers and 2 to 10 parts of an emulsion of asphalt in water, based on an asphalt content in said emulsion of about 60%, said asphalt in said emulsion having a softening point of at least about 150°F and being present in said emulsion in forms substantially all smaller than 10 microns, thoroughly mixing the ingredients of said slurry at a temperature of no more than 110°F, continuously feeding portions of said slurry to means for forming a web therefrom adding a cationic retention aid to the portion of said slurry being fed to said web forming means and subsequently adding an anionic flocculating agent to said slurry being fed to said web forming means, forming a web from the solids of said slurry, forming a laminated product from a plurality of said webs, and curing and hardening said product.

2. The method of claim 1 wherein said slurry further comprises cellulose fibers in an amount of up to 15 parts by weight.

3. The method of claim 1 wherein said slurry further comprises cellulose fibers in an amount of up to 15 parts by weight.

4. The method of claim 1 wherein said web is formed by depositing the solids of said slurry on the surface of a cylinder screen as liquid from said slurry passes through said screen.

5. The method of claim 4 wherein said web is transferred from said cylinder screen to a felt conveyor and from said felt conveyor to an accumulator roll, all without substantial loss of asphalt onto said screen, conveyor or roll.

6. The method of claim 1 wherein said retention aid and said flocculating agent are each added to said slurry at a rate of from about .05 lb. per 1,000 lbs. to about .3 lb. per 1,000 lbs. of mixed total furnish solids.

* * * * *